(12) United States Patent
Shim et al.

(10) Patent No.: US 9,897,793 B2
(45) Date of Patent: Feb. 20, 2018

(54) SUBSTRATE FOR AN ELECTROWETTING DISPLAY DEVICE AND METHOD OF MANUFACTURING THE SUBSTRATE

(71) Applicant: Amazon Technologies, Inc., Seattle, WA (US)

(72) Inventors: Seung Bo Shim, Asan-si (KR); Jin-Ho Ju, Seoul (KR); Dae Ho Kim, Daegu (KR); Sang-Il Kim, Yongin-si (KR); Sung-Kyun Park, Seoul (KR); Jae-Jin Lyu, Yongin-si (KR)

(73) Assignee: Amazon Technologies, Inc., Seattle, WA (US)

( * ) Notice: Subject to any disclaimer, the term of this patent is extended or adjusted under 35 U.S.C. 154(b) by 172 days.

(21) Appl. No.: 14/605,851

(22) Filed: Jan. 26, 2015

(65) Prior Publication Data

US 2015/0138624 A1    May 21, 2015

Related U.S. Application Data

(62) Division of application No. 13/601,297, filed on Aug. 31, 2012, now Pat. No. 8,951,424.

(30) Foreign Application Priority Data

Apr. 17, 2012 (KR) ........................ 10-2012-0039579

(51) Int. Cl.
  *G02B 26/00* (2006.01)
(52) U.S. Cl.
  CPC ...... *G02B 26/005* (2013.01); *G02B 2207/115* (2013.01)

(58) Field of Classification Search
  CPC ...... G02B 26/004; G02B 26/005; G02B 1/04; G03F 7/20
  USPC .................................. 359/290–297, 665–667
  See application file for complete search history.

(56) References Cited

U.S. PATENT DOCUMENTS

| 7,646,545 | B2 * | 1/2010 | Tanaka | G02B 5/005 |
| | | | | 359/665 |
| 7,847,996 | B2 | 12/2010 | Chen et al. | |
| 7,852,547 | B2 | 12/2010 | Kim | |
| 8,599,465 | B2 * | 12/2013 | Hsieh | G02B 3/14 |
| | | | | 345/107 |

(Continued)

FOREIGN PATENT DOCUMENTS

| KR | 1020080002201 A | 1/2008 |
| KR | 1020110057771 A | 6/2011 |

*Primary Examiner* — Thomas K Pham
*Assistant Examiner* — Vipin Patel
(74) *Attorney, Agent, or Firm* — EIP US LLP (57) ABSTRACT

A substrate for an electrowetting display device including a pixel electrode, a partition wall pattern and a water-repellent pattern. The pixel electrode is formed on a base substrate. The partition wall pattern is disposed along an edge of the pixel electrode to expose the pixel electrode. The water-repellent pattern is disposed at a space formed by the pixel electrode and the partition wall pattern to be extended along a lower portion of side surfaces of the partition wall pattern from an area on which the pixel electrode is formed. The water-repellent pattern exposes an upper portion of the side surfaces and an upper surface of the partition wall pattern. Thus, a manufacturing reliability of a substrate for an electrowetting display device is improved to prevent a display quality from being reduced.

18 Claims, 8 Drawing Sheets

(56) References Cited

U.S. PATENT DOCUMENTS

2009/0191334 A1* 7/2009 Dai .................. G02B 26/005
                                              427/162
2010/0033798 A1    2/2010 Wang et al.
2011/0013255 A1    1/2011 Hsieh
2012/0262774 A1* 10/2012 Bae .................. G02B 26/005
                                              359/290

* cited by examiner

SUBSTRATE FOR AN ELECTROWETTING DISPLAY DEVICE AND METHOD OF MANUFACTURING THE SUBSTRATE

CROSS-REFERENCE TO RELATED APPLICATION

This application is a divisional of and claims priority to U.S. patent application Ser. No. 13/601,297, filed on Aug. 31, 2012, which claims priority from and the benefit of Korean Patent Application No. 10-2012-0039579, filed on Apr. 17, 2012, the entirety of which is herein incorporated by reference.

BACKGROUND

Field

Exemplary embodiments of the present invention relate to a substrate for an electrowetting display device and a method of manufacturing the substrate. More particularly, exemplary embodiments of the present invention relate to a substrate for an electrowetting display device having an improved manufacturing reliability and a method of manufacturing the substrate.

Discussion of the Background

An electrowetting display device displays an image by using an aqueous liquid and a non-aqueous liquid. Generally, the electrowetting display device includes a first substrate on which a pixel electrode is formed, a second substrate on which a common electrode is formed, an aqueous liquid interposed between the first and second substrates, and a non-aqueous liquid disposed at each of the pixel electrodes. When a voltage is applied between the pixel electrode and the common electrode, a surface tension of the aqueous liquid is varied so that the non-aqueous liquid is moved to transmit or block light. Thus, the electrowetting display device may display an image.

Because the non-aqueous liquid has a different polarity from the aqueous liquid, the non-aqueous liquid disposed at each pixel has a droplet state. The non-aqueous liquid droplets disposed adjacent to each other are divided by a partition wall formed on the first substrate dividing the pixels. Light is transmitted through the non-aqueous liquid in a state such that when the non-aqueous liquid is dispersed to cover the pixel, the electrowetting display device displays a black image. Alternatively, when the non-aqueous liquid is concentrated at the partition wall, light is transmitted through the pixel.

In order to prevent the aqueous liquid from being infiltrated into elements (i.e., a pixel electrode or a thin-film transistor connected to the pixel electrode) formed on the first substrate to damage the pixel electrode or the thin-film transistor, a water-repellent layer is formed on a substrate on which the pixel electrode and the thin-film transistor are formed, and then the partition wall is formed on the water-repellent layer.

However, when the partition wall is directly formed on the water-repellent layer, the partition wall is stripped from the water-repellent layer as a result of a strong hydrophobic property of the water-repellent layer. Moreover, it is difficult to form a photoresist layer for forming the partition wall on the water-repellent layer. In order to solve the above problems, a surface treating process forming a fine concave-convex shape on a surface of the water-repellent layer is performed. However, the photoresist layer partially remains on the water-repellent layer after forming the partition wall as a result of the concave-convex shape, so that the remaining photoresist layer affects a movement of the aqueous liquid and the non-aqueous liquid. Thus, the display quality of the electrode wetting display device and a manufacturing reliability of a product are reduced.

SUMMARY

Exemplary embodiments of the present invention provide a substrate for an electrowetting display device having an improved manufacturing reliability to prevent display quality from being reduced.

Exemplary embodiments of the present invention also provide a method of manufacturing the above-mentioned substrate.

Additional features of the invention will be set forth in the description which follows, and in part will be apparent from the description, or may be learned by practice of the invention.

An exemplary embodiment of the present invention discloses a method of manufacturing a substrate for an electrowetting display device. In the method, a preliminary partition wall pattern is formed on a base substrate on which a pixel electrode is formed. The preliminary partition wall pattern is disposed along an edge of the pixel electrode to expose the pixel electrode. A water-repellent layer is formed on the base substrate on which the preliminary partition wall pattern is formed. A mask pattern is formed on the base substrate on which the water-repellent layer is formed. The mask pattern exposes an upper surface of the preliminary partition wall pattern and an upper portion of side surfaces connected to the upper portion. A water-repellent pattern is formed by removing the water-repellent layer covering the upper portion of the preliminary partition wall pattern through the mask pattern. A partition wall pattern, which is lower than a height of the preliminary partition wall pattern, is formed by removing the upper portion exposed by the mask pattern and the water-repellent pattern through the mask pattern. The mask pattern is removed from the base substrate on which the water-repellent pattern and the partition wall pattern are formed.

An exemplary embodiment of the present invention also discloses a method of manufacturing a substrate for an electrowetting display device. In the method, a partition wall pattern is formed on a base substrate on which a pixel electrode is formed. The partition wall pattern is disposed along an edge of the pixel electrode to expose the pixel electrode. A water-repellent layer is formed on the base substrate on which the partition wall pattern is formed. A hydrophilic pattern is disposed on the water-repellent layer by hydrophilic treating an upper surface of the partition wall pattern and the water-repellent layer covering an upper portion.

An exemplary embodiment of the present invention also discloses an electrowetting display device including a pixel electrode, a partition wall pattern, and a water-repellant pattern. The pixel electrode is disposed on a base substrate. The partition wall pattern is disposed along an edge of the pixel electrode to expose the pixel electrode. The water-repellant pattern is disposed at a space formed by the pixel electrode and the partition wall pattern to be extended along a lower portion of side surfaces of the partition wall pattern from an area on which the pixel electrode is formed. The water-repellant pattern exposes an upper portion of the side surfaces and an upper surface of the partition wall pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
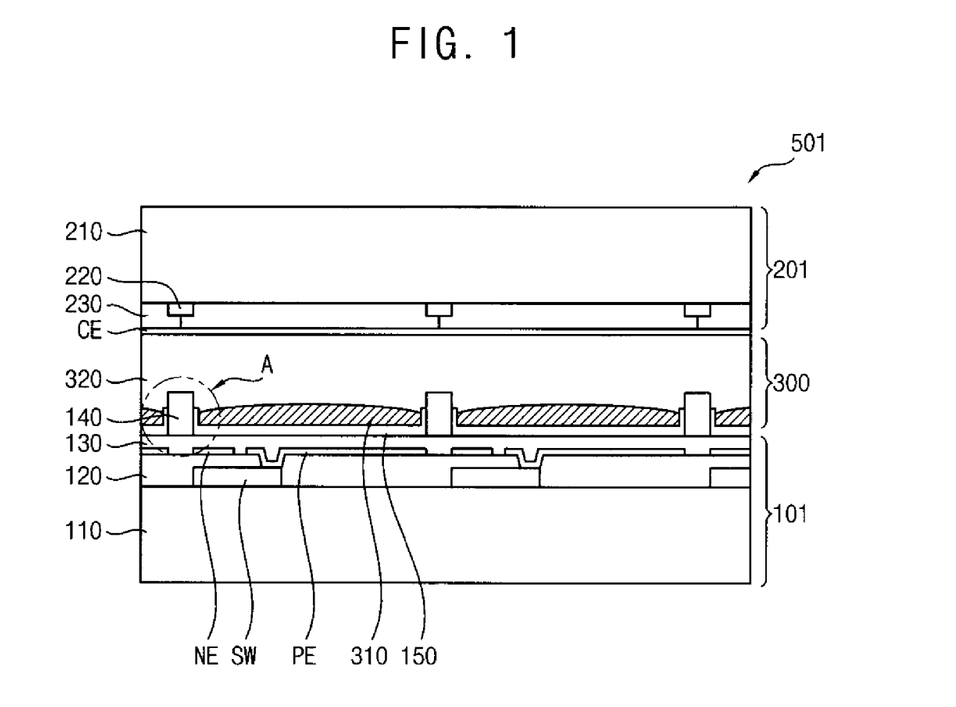
FIG. 1 is a cross-sectional view illustrating an electrowetting display device according to an exemplary embodiment of the present invention.

FIG. 1 is a cross-sectional view illustrating an electrowetting display device according to an exemplary embodiment of the present invention.

Referring to FIG. 1, an electrowetting display device 501 includes a first substrate 101, a second substrate 201, and a fluid layer 300.

The first substrate 101 includes a first base substrate 110, a thin-film transistor SW functioning as a switching element formed on the first base substrate 110, a first protection layer 120, a pixel electrode PE, a notch electrode NE, a second protection layer 130, a partition wall pattern 140, and a water-repellent pattern 150. The first substrate 101 includes a plurality of pixels. The thin-film transistor SW, the pixel electrode PE, the notch electrode NE, and the water-repellent pattern 150 are formed on an area corresponding to the pixel. The pixels adjacent to each other are divided by the partition wall pattern 140. Although not shown in FIG. 1, the first substrate 101 may further include plural signal wirings connected to the thin-film transistor SW.

The first protection layer 120 is disposed on the thin-film transistor SW. The first protection layer 120 may include an insulating material such as silicon oxide or silicon nitride. The first thin-film transistor SW is electrically connected to the pixel electrode PE through a hole formed through the first protection layer 120.

The pixel electrode PE and the notch electrode NE are formed on the first protection layer 120. A pixel voltage is applied to the pixel electrode PE through the signal wirings and the thin-film transistor SW. A voltage applied to the notch electrode NE may be substantially the same as a common voltage applied to a common electrode CE disposed on the second substrate 201. The notch electrode NE may be omitted from the first substrate 101.

The second protection layer 130 covers the pixel electrode PE and the notch electrode NE. The second protection layer 130 may include an insulating material such as silicon oxide or silicon nitride. The second protection layer 130 may prevent corrosion from occurring in the thin-film transistor SW, the pixel electrode PE, and the notch electrode NE.

The partition wall pattern 140 is formed on the second protection layer 130. The partition wall pattern 140 is disposed along an edge of the pixel electrode PE to expose the pixel electrode PE. The partition wall pattern 140 may have a shape in which an opening portion exposing the pixel electrode PE is arranged in a matrix shape when viewed in a plan view. The partition wall pattern 140 may have a hydrophilic property in comparison with the water-repellent pattern 150. For example, a hydrophilic property of an upper portion of the partition wall pattern 140 may be greater than that of a lower portion of the partition wall pattern 140. The partition wall pattern 140 is formed to have a lower height than a gap between the first and second substrates 101 and 201, so that the fluid layer 300 may be interposed between the partition wall pattern 140 and the second substrate 201.

The water-repellent pattern 150 is disposed on the pixel electrode PE and between adjacent partition wall patterns 140. The water-repellent pattern 150 may have a hydrophobic property which is greater than that of the partition wall 140. For example, the water-repellent pattern 150 may be disposed in a space formed by a surface of the second protection layer 130 covering the pixel electrode PE and side surfaces of the partition wall pattern 140. The water-repellent pattern 150 covers an area of the pixel electrode PE and extends to a lower portion of side surfaces of the partition wall pattern 140. Accordingly, the water-repellent pattern 150 may expose an upper portion of the side surfaces of the partition wall pattern 140 and an upper surface of the partition wall pattern 140. A relationship between the water-repellent pattern 150 and the partition wall pattern 140 will be described below with reference to FIG. 2 after the second substrate 201 is described.

The second substrate 201 includes a second base substrate 210, a light-blocking pattern 220, a color layer 230 and a common electrode CE. The light blocking layer 220 is disposed on the second base substrate 210 opposite the partition wall pattern 140. The color layer 230 includes plural color filters displaying the different colors. Each of the color filters is disposed on the second base substrate 210 opposite the pixel electrode PE. The common electrode CE is disposed on the color layer 230 and receives the common voltage. Although not shown in FIG. 1, the second substrate 201 may further include an overcoating layer disposed on the color layer 230 and the common electrode CE.

The fluid layer 300 includes a first fluid 310 having a hydrophobic property and a second fluid 320 having a hydrophilic property. The fluid layer 300 is disposed between the first and second substrates 101 and 201.

The first fluid 310 is disposed on the water-repellent pattern 150 within a space formed by the partition wall pattern 140. The second fluid 320 fills a remaining space above the first fluid 310. The first fluid 310 has a hydrophobic property, and the second fluid 320 has a hydrophilic property. That is, the first fluid 310 and the water-repellent pattern 150 have a hydrophobic property, and the second fluid 320 and the partition wall pattern 140 have a hydrophilic property, so that the first fluid 310 makes contact with the water-repellent pattern 150 to be moved on the water-repellent pattern 150. The first fluid 310 covers a space formed by the partition wall pattern 140 or is concentrated at the partition wall pattern 140, thereby blocking or transmitting light.

In one example, the first fluid 310 may include black oil, and the second fluid 320 may include ethylene glycol (EG). In another example, the color filter layer 230 may be omitted, and thus the first fluid 310 may express color such as a red, a green, and a blue. In still another example, the color filter layer 230 may be omitted and the first fluid 310 may contain a black ink, so that the electrowetting display device 501 may display a black-and-white image.

Although not shown in FIG. 1, the first substrate 101 may further include a reflection plate. The reflection plate may be disposed on the second protection layer 130. Alternatively, the reflection plate may be disposed at an exterior surface of the first base substrate 110. When the reflection plate is disposed on the first substrate 101, the reflection plate of the electrowetting display device 501 reflects an external light passing the second substrate 201 to display an image.

Hereinafter, a detailed structure of the partition wall pattern 140 and the water-repellent pattern will be explained in detail with reference to FIGS. 1 and 2.

Figure 2:
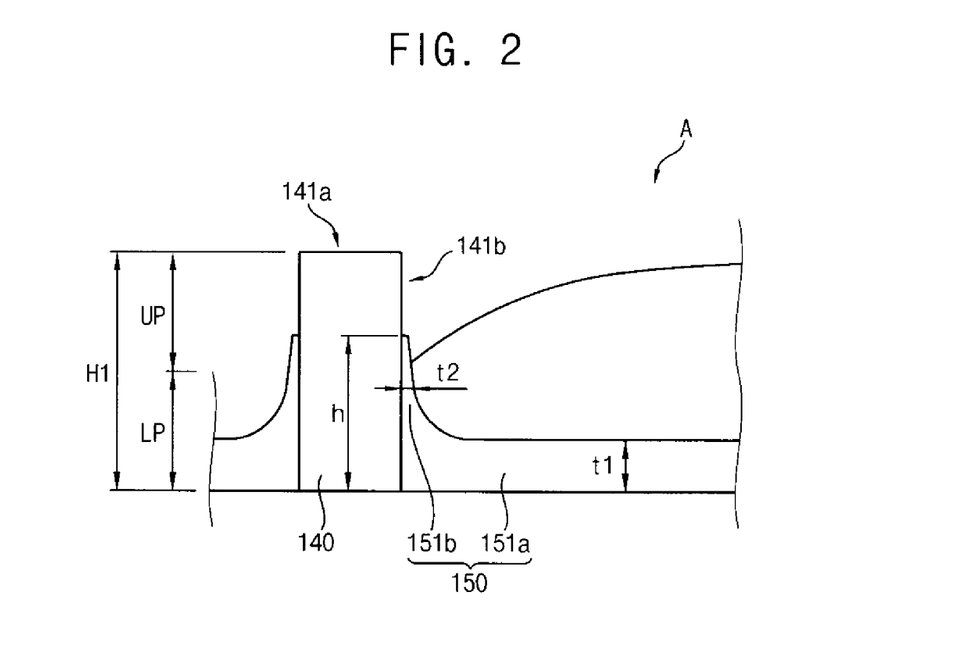
FIG. 2 is an enlarged cross-sectional view showing a portion 'A' in FIG. 1.

FIG. 2 is an enlarged cross-sectional view showing a portion 'A' in FIG. 1.

Referring to FIGS. 1 and 2, the partition wall pattern 140 has a first height H1. For example, the partition wall pattern 140 may include an upper surface 141a and a side surface 141b connected to the upper surface 141a. In this case, a distance between a surface of the second protection layer 130 and the upper surface 141a may be defined as the first height H1. The upper surface 141a may be disposed at a far distance from a surface of the second protection layer 130.

The partition wall pattern 140 may be divided into an upper portion UP and a lower portion LP. The lower portion LP may be defined between a lower boundary part of the partition wall pattern 140, that is, a boundary part connecting with the second protection layer 130, and a middle portion of a first height H1 of the partition wall pattern 140. The upper portion UP may be defined between the middle portion of the first height H1 and the upper surface 141a of the partition wall pattern 140. The water-repellent pattern 150 may cover the lower portion LP of the partition wall pattern 140. That is, the water-repellent pattern 150 may cover the lower portion LP of the partition wall pattern 140 but not the upper portion UP. Alternatively, the water-repellent pattern 150 may cover the lower portion LP and may partially cover the upper portion UP. The water-repellent pattern 150 exposes at least the upper surface 141a of the partition wall pattern 140, and exposes a portion of the upper portion UP. A height 'h' of the water-repellent pattern 150 corresponding to a side surface 141b of the partition wall pattern 140 may be lower than first height H1 of the partition wall pattern 140.

The water-repellent pattern 150 may be divided into a first area portion 151a disposed on the second protection layer 130 exposed by the partition wall pattern 140 and a second area portion 151b extended from the first area portion 151a to be extended along the lower portion LP of the partition wall pattern 140. In some exemplary embodiments the second area portion 151b may be extended to a portion of the upper portion UP adjacent to the lower portion LP besides the lower portion LP. For example, the second area portion 151b may be extended from a surface of the second protection layer 130 to about ⅔ of the first height H1 of the partition wall pattern 140, so that the upper portion UP may be partially exposed. Thus, a portion of the partition wall pattern 140 covered by the water-repellent pattern 150 has a hydrophobic property, and a portion of the partition wall pattern 140 exposed by the water-repellent pattern 150 may be a portion having a hydrophilic property. An affinity between the first fluid 310 and the water-repellent pattern 150 is greater than an affinity between the first fluid 310 and the partition wall pattern 140, so that the first fluid 310 may be disposed in a space formed by the partition wall pattern 140 in a stable condition. Moreover, the first fluid 310 has a property different from the upper surface 141a of the partition wall pattern 140, so that it is difficult for the first fluid 310 to overrun the partition wall pattern 140 into another space. On the other hand, the second fluid 320 has a property different from the first fluid 310, and an affinity between the second fluid 320 and the upper surface 141a of the partition wall pattern 140 is great, so that the second fluid 320 is not mixed with the first fluid 310 and may be disposed at another space except a space of the first fluid 310 in a stable condition.

The first area portion 151a has a first thickness t1 with respect to a surface of the second protection layer 130. The second area portion 151b has a second thickness t2 with respect to a side surface of the lower portion LP. The second thickness t2 is less than the first thickness t1. In the second area portion 151b, the second thickness t2 may be made gradually smaller when it is spaced apart from the first area portion 151a. The water-repellent pattern 150 is disposed in an edge area formed by the partition wall pattern 140 and the second protection layer 130, and the first and second area portions 151a and 151b may connect to each other in a curved shape.

According to the above, the partition wall pattern 140 having a hydrophilic property is exposed by the water-repellent pattern 150, so that the first fluid 310 may be disposed in a space formed by the partition wall pattern 140 and the second protection layer 130 in a stable condition. A hydrophilic process for the partition wall pattern 140 may be omitted as a result of the water-repellent pattern 150. An exemplary method of manufacturing the first substrate 101 shown in FIG. 1 will be described with reference to FIGS. 3A to 3D.

FIG. 3A to FIG. 3D are cross-sectional views explaining one manufacturing method of a first substrate shown in FIG. 1.

Figure 3A:
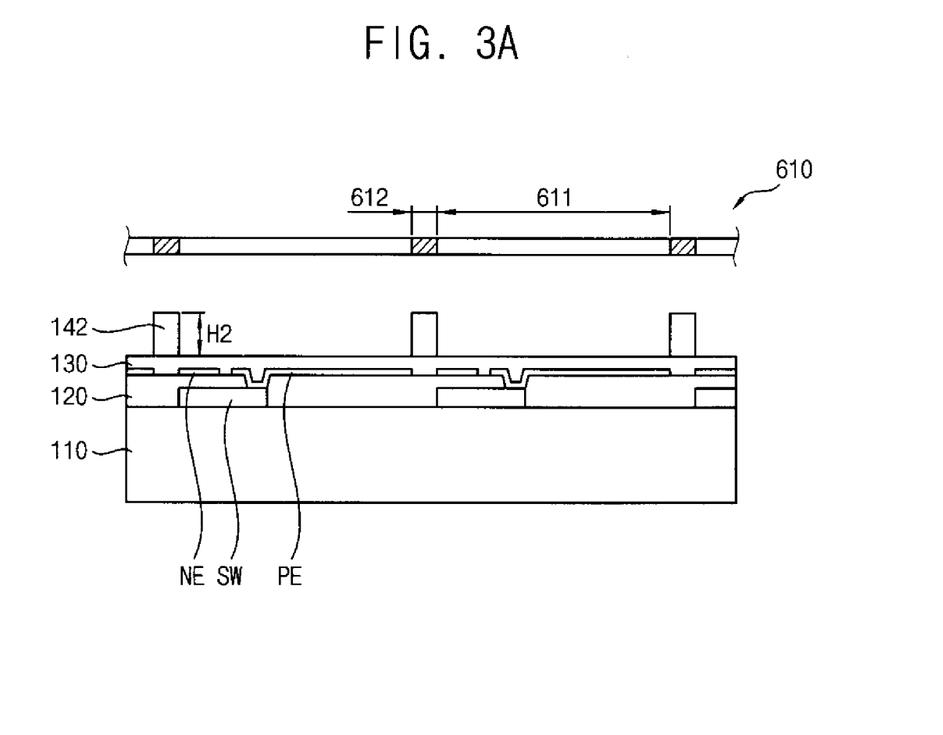
FIG. 3A, FIG. 3B, FIG. 3C, and FIG. 3D are cross-sectional views explaining one manufacturing method of a first substrate shown in FIG. 1.

Referring to FIG. 3A, the thin-film transistor SW, the first protection layer 120, the pixel electrode PE and the notch electrode NE are sequentially formed on the first base substrate 110. The pixel electrode PE and the notch electrode NE may be formed by patterning one electrode layer.

The second protection layer 130 is formed on the first base substrate 110 on which the pixel electrode PE and the notch electrode NE are formed. The second protection layer 130 may be formed by a chemical vapor deposition (CVD) process.

A preliminary partition wall pattern 142 is formed on the first base substrate 110 on which the second protection layer 130 is formed. For example, a photoresist layer may be formed on the first base substrate 110 on which the second protection layer 130 is formed, and then the photoresist layer is exposed and developed by using a mask 610 to form the preliminary partition wall pattern 142. The preliminary partition wall pattern 142 may be altered as the partition wall pattern through a following process. The preliminary partition wall pattern 142 may have a second height H2 greater than the first height H1 of the partition wall pattern 140.

As an example, the photoresist layer may be formed by using a positive type photoresist compound. In this case, the mask 610 includes a light-transmitting portion 611 and a light-blocking portion 612. The light-blocking portion 612 is disposed in an area corresponding to the preliminary partition wall pattern 142. When the photoresist layer is exposed and developed by using the mask 610, the photoresist layer corresponding to the light-transmitting portion 611 is removed by a developing solution, and the photoresist layer corresponding to the light-blocking portion 612 remains. Thus, the preliminary partition wall pattern 142 may be formed.

Alternatively, the photoresist layer may be formed by using a negative type photoresist compound. In this case, the light-transmitting portion 611 of the mask 610 may be disposed at an area corresponding to the preliminary partition wall pattern 142.

Although not shown in FIG. 3A, prior to forming the photoresist layer, an adhesive force enhancing layer may be further formed on the second protection layer 130. That is, as a result of the adhesive force enhancing layer, the photoresist layer may be formed on the second protection layer 130 in a stable condition. A coating material is coated on the second protection layer 130, and then the coated coating material is cured to form the adhesive force enhancing layer. Because the adhesive force enhancing layer is cured, the adhesive force enhancing layer is not removed in a patterning process of the photoresist layer remaining on the first base substrate 110. That is, when the adhesive force enhancing layer is formed prior to forming the photoresist layer, the adhesive force enhancing layer remains on the substrate. The adhesive force enhancing layer may also enhance an adhesive force between the first base substrate 110 and a water-repellent layer 151 (see FIG. 3B) formed on the first base substrate 110 after the preliminary partition wall pattern 142 is formed.

Figure 3B:
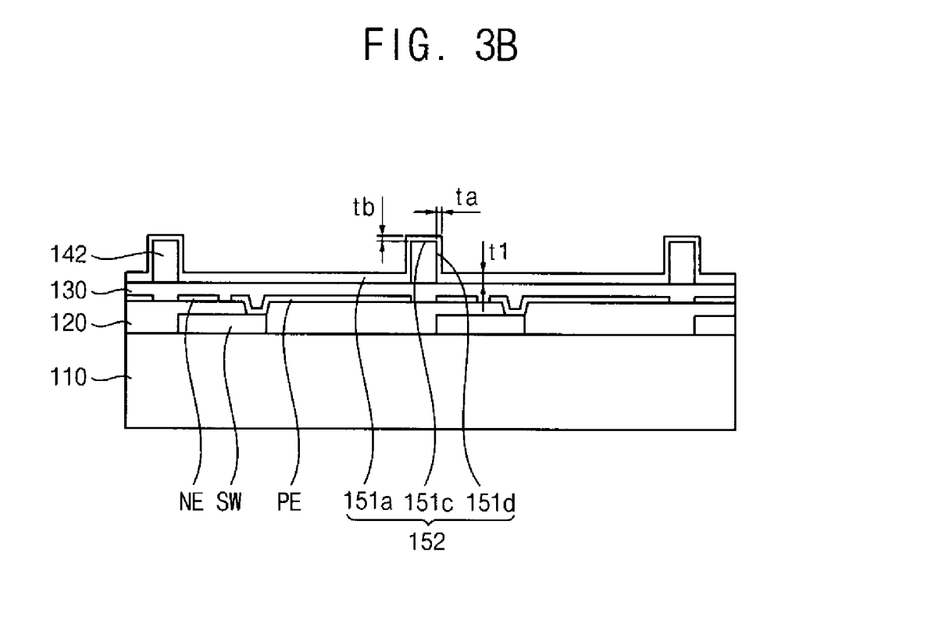

Referring to FIG. 3B, a water-repellent layer 151 is formed on the first base substrate 110 on which the preliminary partition wall pattern 142 is formed. The water-repellent layer 151 includes a hydrophobic compound. For example, "Teflo AF1600" (the trade name of the product made by "Du Pont U.S."), CYTOP (the trade name of the product made by "Asahi Glass Company, Limited, Tokyo"), etc., is formed on the first base substrate 110, so that the water-repellent layer 151 may be formed. In one example, the water-repellent layer 151 may be coated on the first base substrate 110 by slit and/or spin coating the hydrophobic compound.

For example, the water-repellent layer 151 may be formed on the second protection layer 130 in the first thickness t1. That is, a portion 151a of the water-repellent layer 151 disposed on the second protection layer 130 may have the first thickness t1. In this case, the hydrophobic compound is coated through a slit coating process and/or a spin coating process, so that portions 151c and 151d of the water-repellent layer 151 covering the preliminary wall pattern 142 may be formed to have a thickness thinner than the first thickness t1. For example, a thickness 'ta' of the first portion 151c of the water-repellent layer 151 on the preliminary partition wall pattern 142 may be smaller than the first thickness 't1'. Moreover, a thickness 'tb' of the second portion 151d of the water-repellent layer 151 covering a side surface of the partition wall pattern 142 may be smaller than the first thickness 't1'. The thickness 'ta' of the first portion 151c may be substantially smaller than or equal to the thickness 'ta' of the second portion 151d. For example, a ratio of the first thickness 't1' and the thickness 'ta' of the first portion 151c may be about 4:1. Moreover, a ratio of the first thickness 't1' and the thickness 'tb' of the second portion 151d may be about 4:1.

Figure 3C:
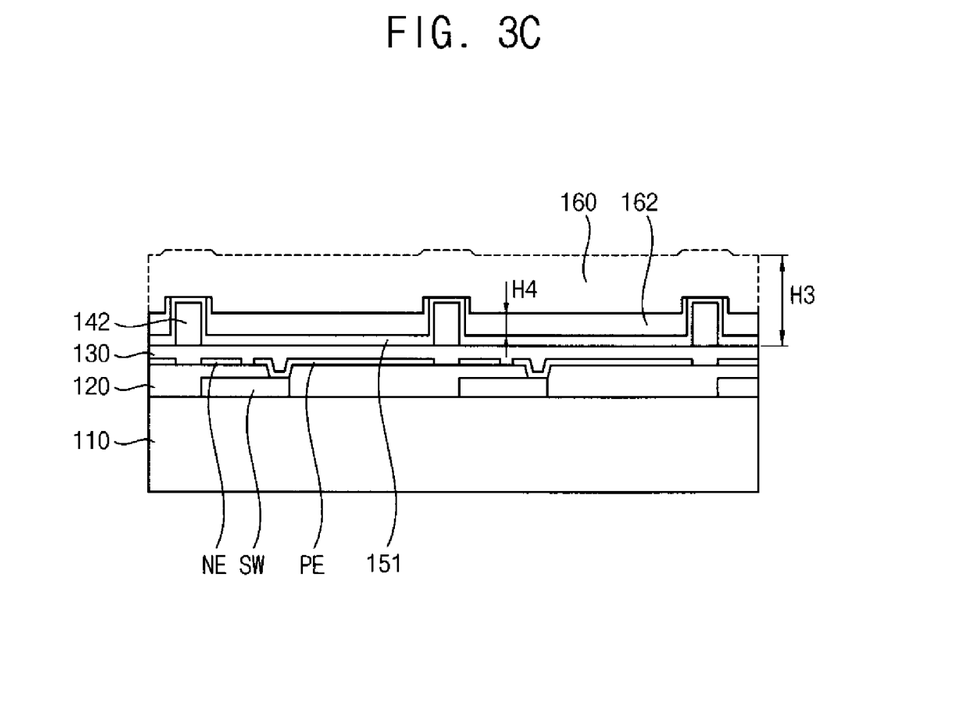

Referring to FIG. 3C, a planarization layer 160 is formed on the first base substrate 110 on which the water-repellent layer 151 is formed, and then the planarization layer 160 is patterned to form a mask pattern 162.

The planarization layer 160 has a third height H3 greater than the second height H2 of the preliminary partition wall pattern 142. The planarization layer 160 is formed to wholly cover the water-repellent layer 151 covering the preliminary partition wall pattern 142. For example, the planarization layer 160 may be formed by using a negative type photoresist compound. The planarization layer 160 may be formed by a spin coating method and/or a slit coating method. A method of forming the planarization layer 160 is not limited to the coating method. The planarization layer 160 may be formed by using an ink jet printing process, a screen or silk printing process, a one drop filling (ODF) process, a transfer process, a rolling process, etc.

Then, a desired thickness of the planarization layer 160 is removed through an ashing process to form the mask pattern 162. A height H4 of the mask pattern 162 is less than a height H2 of the preliminary partition wall pattern 142. Thus, the mask pattern 162 exposes the water-repellent layer 151 disposed on an upper surface of the preliminary partition wall pattern 142. A portion of the mask pattern 162 partially covers the water-repellent layer 152 making contact with a side surface of the preliminary partition wall pattern 142. A thickness of the mask pattern 162 making contact with a side surface of the preliminary partition wall pattern 142 may be less than the height H4 of the mask pattern 162 stacked on the second protection layer 130 and the water-repellent layer 151.

Figure 3D:
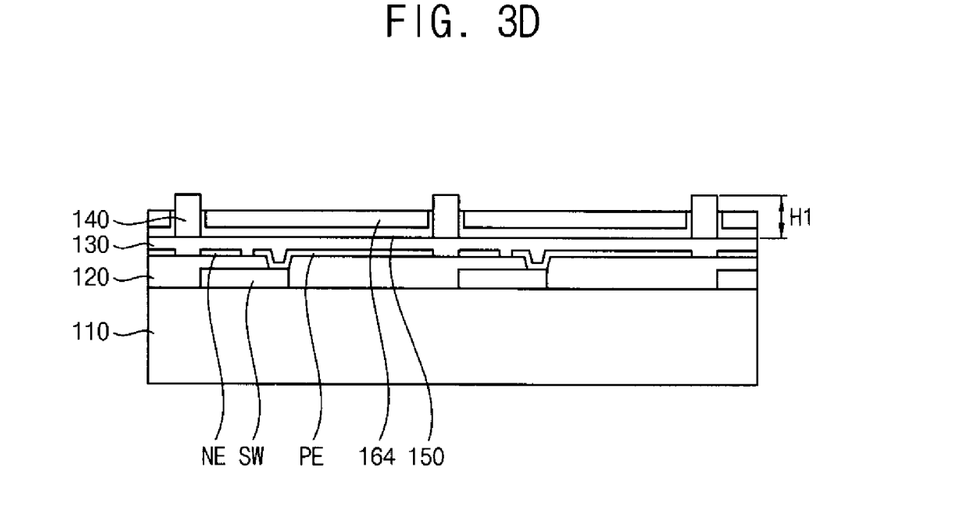

Referring to FIG. 3D, the water-repellent layer 151 and the preliminary partition wall pattern 142 that are exposed by the mask pattern 162, and the mask pattern 162 are partially removed to form the partition wall pattern 140, the water-repellent pattern 150 and a remaining pattern 164 on the first base substrate 110.

For example, the water-repellent layer 151 exposed by the mask pattern 162 may be removed. The water-repellent pattern 151 covering an upper surface and side surfaces of the preliminary partition wall pattern 142 may be removed and the mask pattern 162 may be partially removed. Thus, the upper surface and side surfaces of the preliminary partition wall pattern 142 are exposed, and the water-repellent pattern 150 is formed. The water-repellent layer 151 and the mask pattern 162 may be removed through a dry etching process.

Then, in a state where the preliminary partition wall pattern 142 is partially exposed, a dry etching process is performed to partially remove the preliminary partition wall pattern 142. Thus, a portion of the preliminary partition wall pattern 142 is removed, so that the partition wall pattern 140 having the first height H1 shown in FIG. 2 is formed.

The upper surface 141a of the partition wall pattern 140 and a portion of a side surface 141b of the upper portion UP are exposed by the dry etching process. That is, an over-etching is performed in a process of removing the water-repellent layer 151, so that it is substantially equal to a result where a hydrophilic treatment of the partition wall pattern 140 is additionally performed. That is, an additional hydrophilic treatment for the partition wall pattern 140 may be omitted.

Then, the remaining pattern 164 is removed by a strip process. For example, the remaining pattern 164 may be removed by a wet etching process using a strip solution. Alternatively, the remaining pattern 164 may be removed by a dry etching process using an ashing process. Thus, the first substrate 101 shown in FIG. 1 is manufactured.

The first fluid 310 is disposed on the first substrate 101, and then the second fluid 320 is injected between the first and second substrates 101 and 201 that are combined with each other, so that the electrowetting display device 501 may be manufactured as shown in FIG. 1.

The preliminary partition wall pattern 142 for forming the partition wall pattern 140 is formed, and then the water-repellent layer 151 is formed, so that a process for stably forming the partition wall pattern 140 on the water-repellent layer 151 may be omitted. Thus, the partition wall pattern 140 and the water-repellent pattern 150 are stably formed on the water-repellent layer 151 without the need for an additional surface treating process for the water-repellant layer 151. Therefore, product reliability and manufacturing reliability of the electrode-wetting display device 501 may be improved.

Hereinafter, another method of manufacturing the first substrate 101 of FIG. 1 will be explained with reference to FIGS. 4A, 4B, 5A and 5B.

Figure 4A:
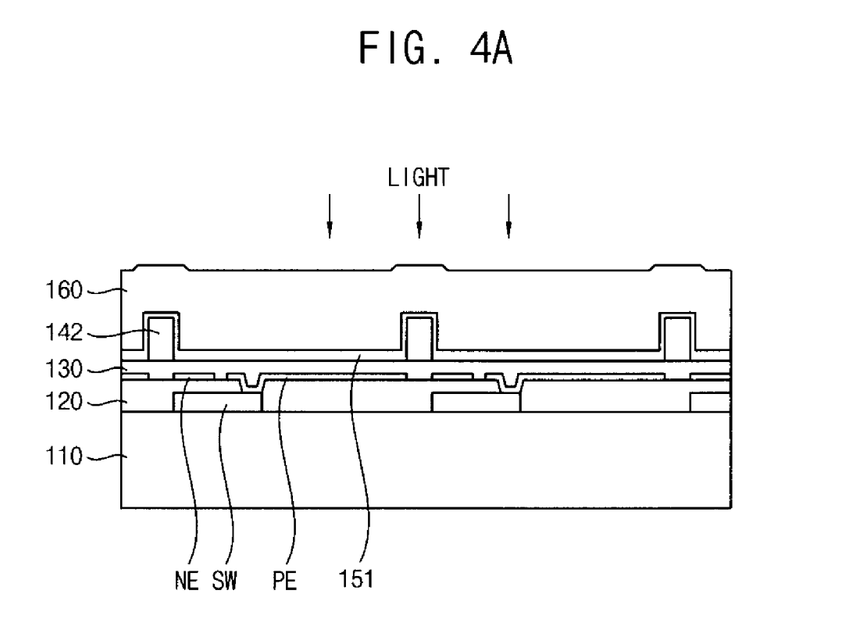
FIG. 4A and FIG. 4B are cross-sectional views explaining another manufacturing method of a first substrate shown in FIG. 1.
Figure 4B:
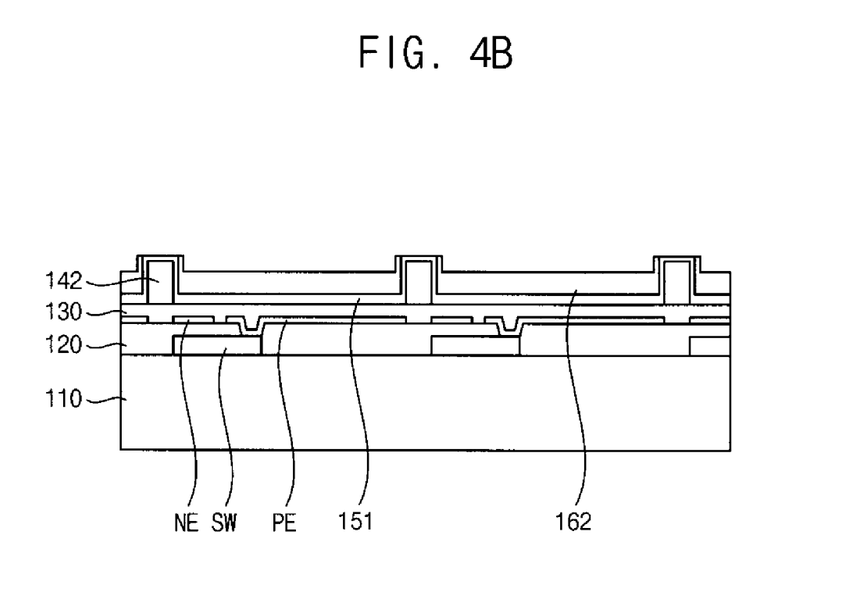

FIG. 4A and FIG. 4B are cross-sectional views explaining another manufacturing method of a first substrate shown in FIG. 1.

Referring to FIGS. 1 and 4A, the second protection layer 130, the preliminary partition wall pattern 142, and the water-repellent layer 151 are sequentially formed. Forming processes of the second protection layer 130, the preliminary partition wall pattern 142, and the water-repellent layer 151 are substantially the same as forming processes described with reference to FIGS. 3A and 3B, and thus any repetitive detailed explanation may hereinafter be omitted.

A planarization layer 160 is formed on the first base substrate 110 on which the water-repellent layer 151 is formed. The planarization layer 160 is formed by using a positive type photoresist compound. The planarization layer 160 is formed to have a height which is greater than the preliminary partition wall pattern 142 to completely cover the first base substrate 110 on which the water-repellent layer 151 is formed.

Then, the first base substrate 110 on which the planarization layer 160 is formed is partially exposed to light. When a light reaction compound configuring the planarization layer 160 is light reacted, about 50% of the light is provided to the planarization layer 160, and a partial exposure process of the planarization layer 160 may be performed. That is, when the planarization layer 160 includes the positive type photoresist compound, a specific thickness of the planarization layer 160 is light reacted by the partial exposure process.

Referring to FIG. 4B, when the specific thickness of the planarization layer 160 is reacted to form the partially exposed planarization layer 160, the specific thickness of the planarization layer 160 is removed. Because a developing solution is applied to a portion of the exposed planarization layer 160, a specific thickness of the planarization layer 160 may be removed by the developing solution after the partial exposure process. Thus, a portion of the planarization layer 160 remains on the first base substrate 110 to form the mask pattern 162.

The water-repellent pattern 150 and the partition wall pattern 140 may be formed by removing the water-repellent layer 151 and a portion of the preliminary partition wall pattern 142 through the process described with reference to FIG. 3D. In a process forming the partition wall pattern 140, the mask pattern 162 is partially removed to be the remaining pattern 162 shown in FIG. 3D.

The remaining pattern 164 may be removed through a wet etching process using a strip solution or a dry etching process using a gas.

Alternatively, the remaining pattern 164 may be formed by exposure, and then the exposure remaining pattern may be removed by using a developing solution. The amount of light which is necessary to expose the remaining pattern 164 may be about twice the amount of light amount used in the partial exposure process. Because the remaining pattern 164 is exposed, the remaining pattern 164 is dissolved in a state capable of being dissolved by the developing solution. Thus, the developing solution is sprayed onto the first base substrate 110, or otherwise the first base substrate 110 is placed in a container containing the developing solution, so that the remaining pattern 164 may be removed.

Figure 5A:
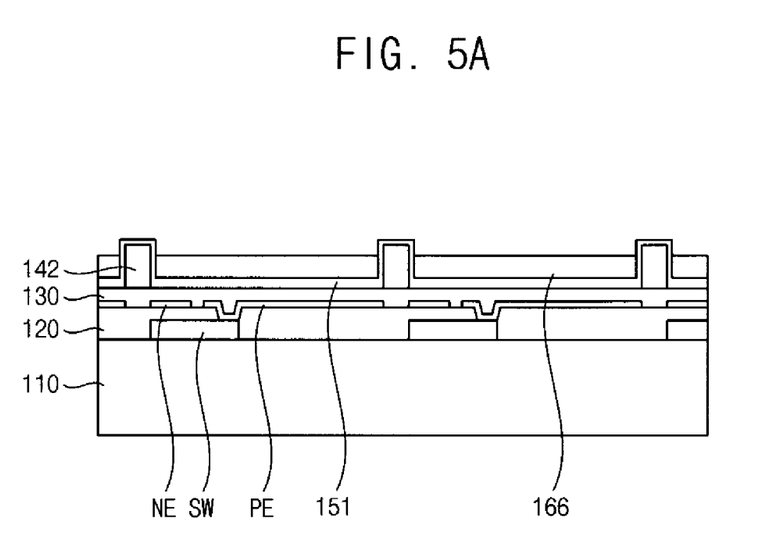
FIG. 5A and FIG. 5B are cross-sectional views explaining still another manufacturing method of a first substrate shown in FIG. 1.
Figure 5B:
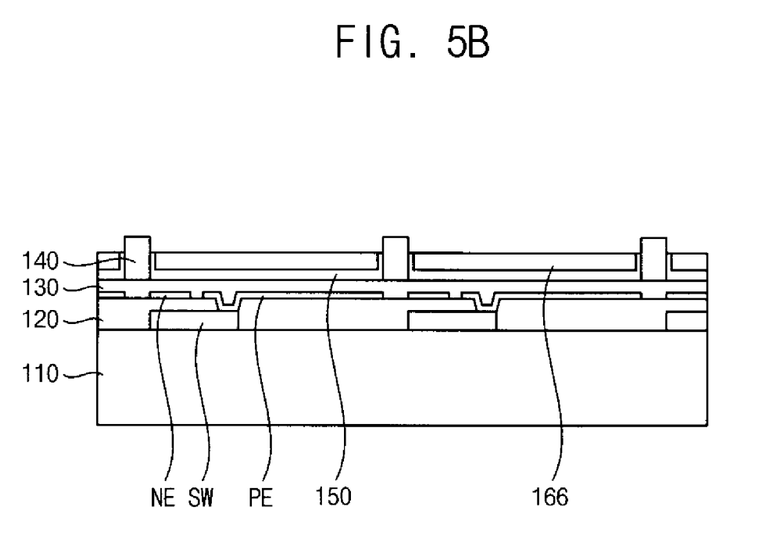

FIG. 5A and FIG. 5B are cross-sectional views explaining still another manufacturing method of a first substrate shown in FIG. 1.

Referring to FIGS. 1 and 5A, the second protection layer 130, the preliminary partition wall pattern 142, and the water-repellent layer 151 are sequentially formed. Forming processes of the second protection layer 130, the preliminary partition wall pattern 142 and the water-repellent layer 151 are substantially the same as forming processes described with reference to FIGS. 3A and 3B, and thus any repetitive detailed explanation may hereinafter be omitted.

A mask pattern 166 is formed on the first base substrate 110 on which the water-repellent layer 151 is formed. The mask pattern 166 is formed to have a height less than the preliminary partition wall pattern 142. The mask pattern 166 may be formed by slit and/or spin coating a coating material. A coating material amount forming the mask pattern 166 is less than a coating material amount forming the planarization layer 160. The coating material, which is disposed on an upper surface of the preliminary partition wall pattern 142 or the water-repellent layer 151 corresponding to an upper side surface of the preliminary partition wall pattern 142, is dropped into a space formed by the preliminary partition wall pattern 142 and the second protection layer 130. Thus, the upper surface of the preliminary partition wall pattern 142 is not covered by the mask pattern 166 different from FIG. 3C or FIG. 4B.

Referring to FIG. 5B, the water-repellent layer 151 and the preliminary partition wall pattern 142 are partially removed by using the mask pattern 166 as an etch stop layer, so that the water-repellent pattern 150 and the partition wall pattern 140 may be formed. The water-repellent pattern 150 and the partition wall pattern 140 are formed, so that an additional hydrophilic treatment for the partition wall pattern 140 is not required.

Then, the mask pattern 166 may be removed to manufacture the first substrate 101. The mask pattern 166 may be removed by a stripe solution or gas. Alternatively, the mask pattern 166 may be removed by using a developing solution after an additional exposure process is performed.

As described above, the mask pattern 166 may be formed to have a height less than the preliminary partition wall pattern 142 by adjusting the coating material amount, so that a process for forming the mask pattern 166 may be simplified. Moreover, the partition wall pattern 140 and the water-repellent pattern 150 may be formed by using the mask pattern 166, so that an additional hydrophilic treatment for the partition wall pattern 140 may be omitted.

Figure 6:
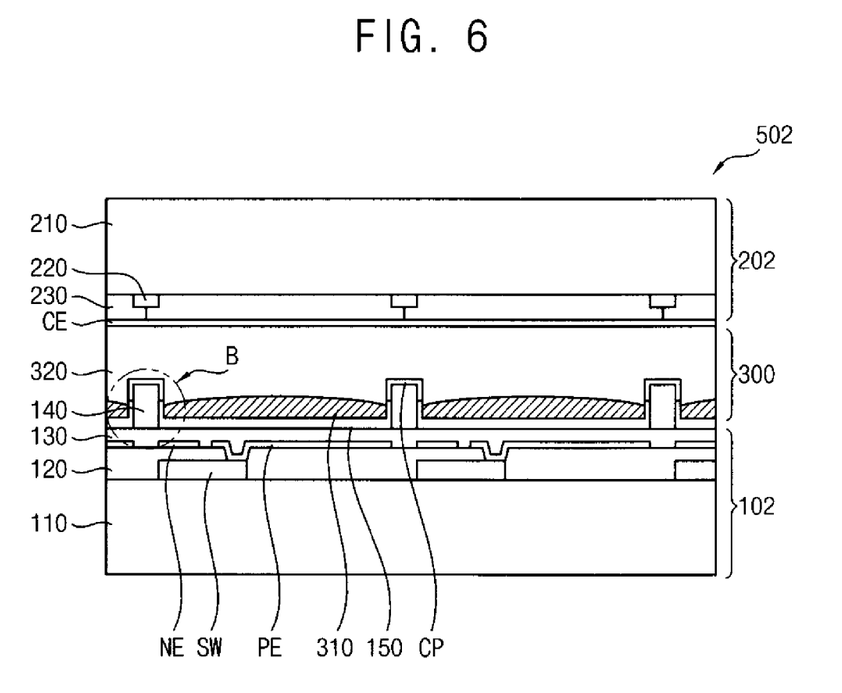
FIG. 6 is a cross-sectional view illustrating an electrowetting display device according to another exemplary embodiment of the present invention.

FIG. 6 is a cross-sectional view illustrating an electrowetting display device according to another exemplary embodiment of the present invention.

Referring to FIG. 6, an electrowetting display device 502 includes a first substrate 102, a second substrate 202 and a fluid layer 300. The second substrate 202 and the fluid layer 300 are substantially the same as the second substrate 201 and the fluid layer 300 described with reference to FIG. 1, and thus any repetitive detailed explanation is hereinafter be omitted.

The first substrate 102 includes a first base substrate 110, a thin-film transistor SW that is a switching element formed on the first base substrate 110, a first protection layer 120, a pixel electrode PE, a notch electrode NE, a second protection layer 130, a partition wall pattern 140, a water-repellent pattern 150 and a hydrophilic pattern CP. The first substrate 102 is substantially the same as the first substrate 101 described with reference to FIG. 1 except for at least the hydrophilic pattern CP. Thus, any repetitive detailed explanation is hereinafter omitted.

The hydrophilic pattern CP covers an upper surface and an upper portion of the partition wall pattern 140. Although the hydrophilic pattern CP has a hydrophilic property, the hydrophilic pattern CP is connected to the water-repellent pattern 150 to configure one layer completely covering the first base substrate 110 on which the partition wall pattern 140 is formed. Although a hydrophilic property of the partition wall pattern 140 is greater than that of the water-repellent pattern 150, a hydrophilic property of an upper portion of the partition wall pattern 140 may be more greatly increased as a result of the hydrophilic pattern CP. Because the hydrophilic pattern CP contains more hydroxyl (—OH) rather than the water-repellent pattern 150, the hydrophilic pattern CP has a strong hydrophilic property.

Figure 7:
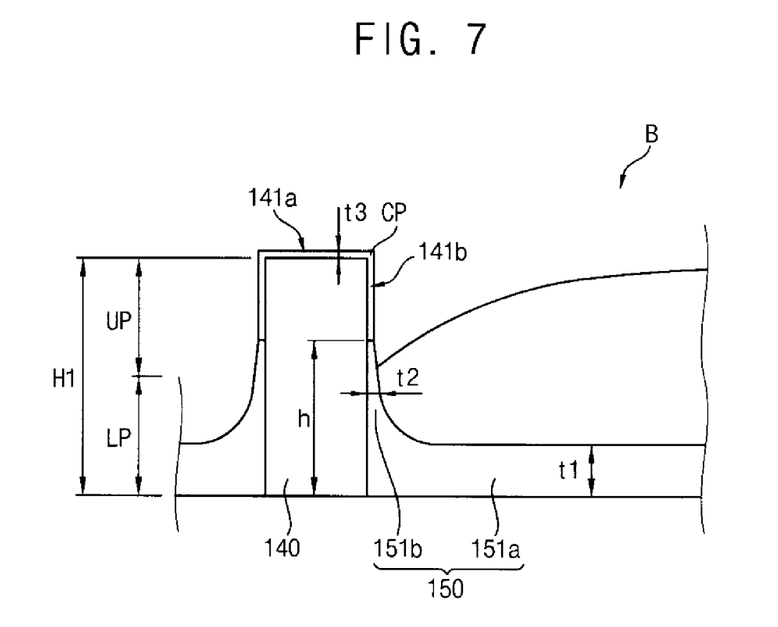
FIG. 7 is an enlarged cross-sectional view showing a portion 'B' in FIG. 6.

FIG. 7 is an enlarged cross-sectional view showing a portion 'B' in FIG. 6.

Referring to FIGS. 6 and 7, the partition wall pattern 140 has a first height H1. The water-repellent pattern 150 may cover at least the lower portion LP of the partition wall pattern 140. That is, the water-repellent pattern 150 may cover the lower portion LP of the partition wall pattern 140 but not the upper portion UP. Alternatively, the water-repellent pattern 150 may cover the lower portion LP of the partition wall pattern 140 and may partially cover the upper portion UP of the partition wall pattern 140. In this case, the water-repellent pattern 150 exposes an upper surface 141a of the partition wall pattern 140 and a portion of the upper portion UP. The hydrophilic pattern CP covers the upper portion UP exposed by the water-repellent pattern 150 and the upper surface 141a of the partition wall pattern 140. An electrowetting display device 502 is substantially the same as the electrowetting display device 501 described with reference to FIG. 2 except for at least the hydrophilic pattern CP, and thus any repetitive detailed explanation is hereinafter be omitted.

Figure 8A:
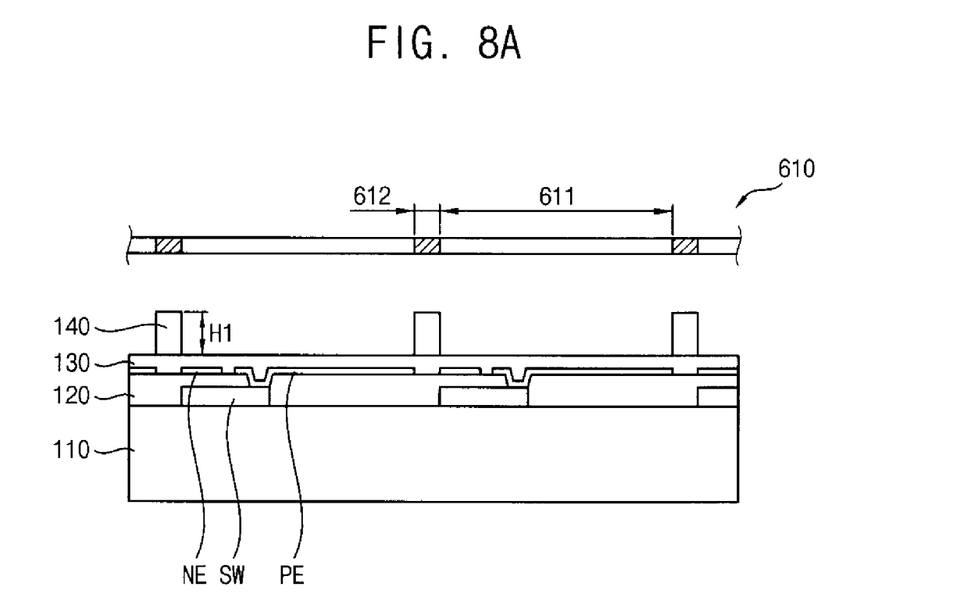
FIG. 8A, FIG. 8B, and FIG. 8C are cross-sectional views explaining a manufacturing method of a first substrate shown in FIG. 6.
Figure 8B:
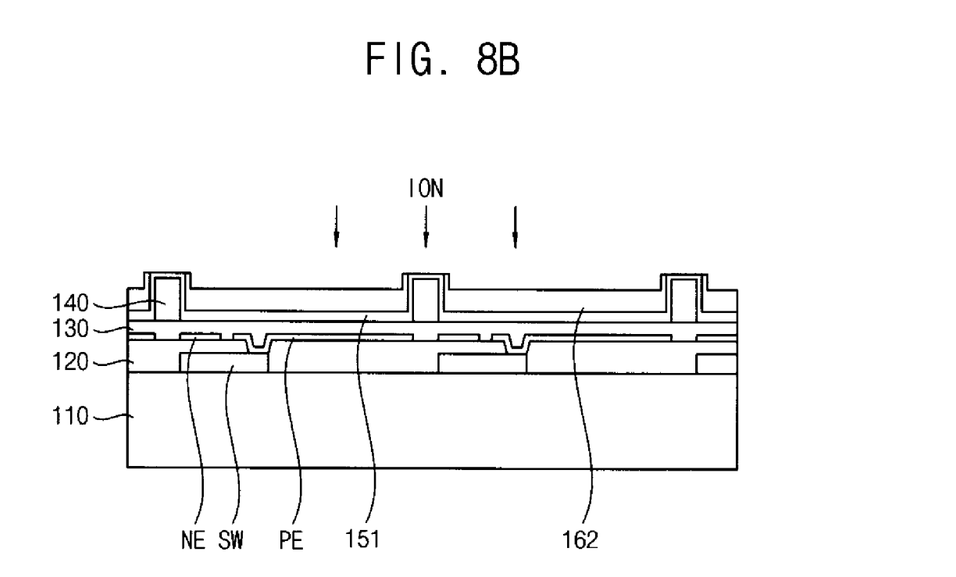
Figure 8C:
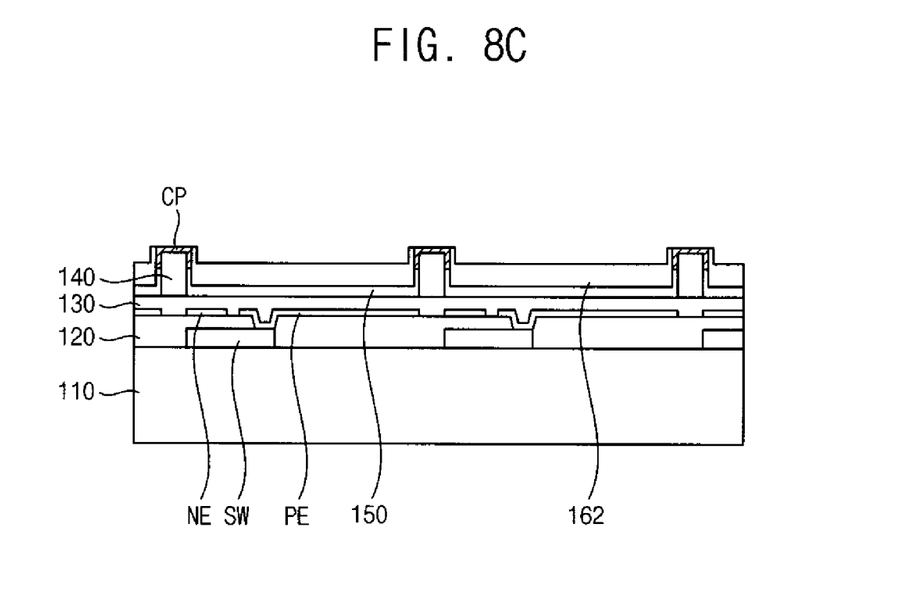

FIG. 8A to FIG. 8C are cross-sectional views explaining a manufacturing method of a first substrate shown in FIG. 6.

Referring to FIG. 8A, the thin-film transistor SW, the first protection layer 120, the pixel electrode PE and the notch electrode NE are sequentially formed on the first base substrate 110. The pixel electrode PE and the notch electrode NE may be formed by patterning one electrode layer. Then, the second protection layer 130 is formed on the first base substrate 110 on which the pixel electrode PE and the notch electrode NE are formed.

The partition wall pattern 140 is formed on the first base substrate 110 on which the second protection layer 130 is formed. The partition wall pattern 140 has a first height H1. A photoresist layer is formed on the first base substrate 110 on which the second protection layer 130 is formed, and then the photoresist layer is exposed and developed by using a mask 610 to form the partition wall pattern 140. The mask 610 has a light-transmitting portion 611 and a light-blocking portion 612. The partition wall pattern 140 formed by patterning the photoresist layer is an element remaining on the first substrate 102 after final manufacture.

Referring to FIG. 8B, a water-repellent layer 151 and a mask pattern 162 are sequentially formed on the first base substrate 110 on which the partition wall pattern 140 is formed. Forming processes of the water-repellent layer 151 and the mask pattern 162 are substantially the same as forming process described with reference to FIGS. 3B and 3C, and thus any repetitive detailed explanation is hereinafter omitted.

A hydrophilic treatment is performed on the first base substrate 110 on which the mask pattern 162 is formed. For example, ions are injected into the first base substrate 110 or a reaction gas is provided to the first base substrate 110, so that the water-repellent layer 151 exposed by the mask pattern 162 may be chemically treated.

Referring to FIG. 8C, the hydrophilic treated water-repellent layer 151 is chemically reacted, so that the hydrophilic pattern CP is formed on the water-repellent layer 151. The hydrophilic pattern CP is a portion of the water-repellent layer 151 that is chemically reacted to be formed thereon. The water-repellent layer 151 except the hydrophilic pattern CP may be defined as the water-repellent pattern 150. Because a portion of the water-repellent layer 151 is chemically reacted to form the hydrophilic pattern CP, the hydrophilic pattern CP is connected to the water-repellent pattern 150 to configure one layer. That is, the first base substrate 110 on which the partition wall pattern 140 is formed may be completely covered by the hydrophilic pattern CP and the water-repellent pattern 150.

Then, the mask pattern 162 is removed from the first base substrate 110 on which the partition wall pattern 140 is formed. The mask pattern 162 may be removed by a strip solution or gas in an ashing process. Alternatively, the mask pattern 162 may be removed by using a developing solution after an additional exposure process is performed.

According to the above, the hydrophilic pattern CP and the water-repellent pattern 150 being formed on the partition wall pattern 140 may prevent the water-repellent pattern 150 from being damaged or foreign substances from being introduced in a process forming the partition wall pattern

140. Therefore, product reliability and manufacturing reliability of the electrode-wetting display device 502 may be improved.

According to the above, a water-repellent layer and a partition wall pattern may be stably formed on a base substrate without an additional surface treating process of a base substrate for stably forming a water-repellent layer. Moreover, a hydrophilic treatment may be selectively performed on an upper portion of a partition wall pattern by removing or chemically treating a water-repellent layer covering an upper portion of the partition wall.

Particularly, when a surface of the water-repellent layer is damaged or a foreign substance is present, a movement of the aqueous liquid and the non-aqueous liquid may be affected. However, a partition wall pattern or a preliminary pattern for forming the partition wall pattern is formed prior to forming the water-repellent layer, so that damage to the water-repellent layer may be prevented and foreign substances may be prevented from being introduced in a process forming the partition wall pattern or the preliminary pattern.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An electrowetting display device comprising:
   an electrode layer disposed on a substrate;
   partition walls disposed adjacent to an edge of the electrode layer;
   a first portion of a water-repellent layer disposed on the electrode layer and at least partially surrounded by the partition walls, wherein the first portion of the water-repellent layer is substantially disposed in a first plane; and
   a layer disposed on the partition walls and comprising both a water repellent region and a hydrophilic region, the water repellent region including a second portion of the water-repellent layer substantially disposed in a second plane perpendicular to the first plane and disposed on a lower portion of side surfaces of the partition walls; and the hydrophilic region including a hydrophilic layer disposed on an upper portion of the side surfaces of the partition walls and a top surface of the partition walls.

2. The electrowetting display device of claim 1, further comprising a first fluid and a second fluid, wherein the first fluid at least partially covers the first portion of the water-repellent layer and wherein the second fluid is in contact with the upper portion of the side surfaces of the partition walls.

3. The electrowetting display device of claim 2, wherein the first fluid comprises oil and the second fluid comprises ethylene glycol.

4. The electrowetting display device of claim 2, further comprising a common electrode disposed directly on the second fluid, wherein
   the electrode layer comprises a pixel electrode and a notch electrode, the pixel electrode to apply a first voltage to the second fluid while the notch electrode and the common electrode apply a second voltage to the second fluid, the second voltage being different from the first voltage.

5. The electrowetting display device of claim 1, wherein the first portion of the water-repellent layer and the second portion of the water-repellent layer have a greater hydrophobicity than the partition walls.

6. The electrowetting display device of claim 1, wherein
   the partition walls extend perpendicularly from the substrate by a first distance,
   the second portion of the water-repellent layer is disposed along the lower portion of the side surfaces of the partition walls from the first portion of the water-repellent layer to a second distance from the substrate, and
   the second distance is less than the first distance.

7. The electrowetting display device of claim 1, wherein the hydrophilic layer and the water-repellent layer are connected to each other to form one layer completely covering the substrate on which the partition walls are formed.

8. The electrowetting display device of claim 1, wherein the partition walls comprise a photoresist material.

9. The electrowetting display device of claim 1, wherein the hydrophilic layer comprises an ion-injected material.

10. The electrowetting display device of claim 1, wherein
    the first portion of the water-repellent layer is disposed on the electrode layer with a first thickness,
    the second portion of the water-repellent layer is disposed on the lower portion of the side surfaces of the partition walls with a second thickness, and
    the second thickness is less than the first thickness.

11. The electrowetting display device of claim 1, further comprising a silicon oxide layer or a silicon nitride layer between the first portion of the water-repellent layer and the electrode layer.

12. The electrowetting display device of claim 1, wherein the water-repellent layer comprises a first concentration of hydroxyl and the hydrophilic layer comprises a second concentration of hydroxyl that is greater than the first concentration of hydroxyl.

13. An electrowetting display device comprising:
    a first substrate and a second substrate facing the first substrate;
    a fluid layer between the first substrate and the second substrate;
    an electrode layer disposed on the first substrate;
    partition walls disposed on the first substrate and adjacent to an edge of the electrode layer;
    a horizontal portion of a water-repellent layer disposed on the electrode layer and between the partition walls; and
    a layer that comprises both a water repellent region and a hydrophilic region, the layer disposed on the partition walls, the water repellent region including
       a vertical portion of the water-repellent layer that is substantially perpendicular to the horizontal portion of a water-repellent layer, wherein the vertical portion of the water-repellent layer covers a lower portion of the partition walls; and wherein the hydrophilic region includes
    a hydrophilic layer disposed on an upper portion and a top surface of the partition walls.

14. The electrowetting display device of claim 13, wherein the fluid layer comprises a first fluid and a second fluid, wherein the first fluid at least partially covers the horizontal portion of the water-repellent layer and wherein the second fluid is in contact with the upper portion of the partition walls.

15. The electrowetting display device of claim 13, wherein the horizontal portion of the water-repellent layer and the vertical portion of the water-repellent layer have a greater hydrophobicity than the partition walls.

16. The electrowetting display device of claim 13, wherein
- the partition walls extend perpendicularly from the first substrate by a first distance,
- the vertical portion of the water-repellent layer is disposed on the lower portion of the partition walls from the horizontal portion of the water-repellent layer to a second distance from the first substrate, and
- the second distance is less than the first distance.

17. The electrowetting display device of claim 13, wherein
- the horizontal portion of the water-repellent layer is disposed on the electrode layer with a first thickness,
- the vertical portion of the water-repellent layer is disposed on the lower portion of the partition walls with a second thickness, and
- the second thickness is less than the first thickness.

18. The electrowetting display device of claim 13, wherein the water-repellent layer comprises a first concentration of hydroxyl and the hydrophilic layer comprises a second concentration of hydroxyl that is greater than the first concentration of hydroxyl.

\* \* \* \* \*

UNITED STATES PATENT AND TRADEMARK OFFICE
CERTIFICATE OF CORRECTION

PATENT NO. : 9,897,793 B2  
APPLICATION NO. : 14/605851  
DATED : February 20, 2018  
INVENTOR(S) : Shim et al.

Page 1 of 1

It is certified that error appears in the above-identified patent and that said Letters Patent is hereby corrected as shown below:

In the Claims

In Column 13, Lines 44-47, in Claim 1, delete "the hydrophilic............walls." and insert the same at Line 45 as a new sub point.

In Column 14, Lines 54-55, in Claim 13, delete "wherein the............includes" and insert the same at Line 55 as a new sub point.

In Column 14, Lines 56-57, in Claim 13, delete "a hydrophilic............walls." and insert the same at Line 56, after "includes" as a continuation sub point.

Signed and Sealed this  
Twentieth Day of November, 2018

Andrei Iancu  
*Director of the United States Patent and Trademark Office*